US005882566A

United States Patent [19]

Hsu et al.

[11] Patent Number: 5,882,566

[45] Date of Patent: Mar. 16, 1999

[54] METHOD FOR PREPARING A HIGH STRENGTH, HIGH MODULUS ELECTRICALLY CONDUCTIVE FIBER

[75] Inventors: Che-Hsiung Hsu; Hsiang Shih, both of Wilmington, Del.

[73] Assignee: E. I. du Pont de Nemours and Company, Wilmington, Del.

[21] Appl. No.: 873,073

[22] Filed: Jun. 11, 1997

Related U.S. Application Data

[63] Continuation-in-part of Ser. No. 760,180, Sep. 9, 1991, Pat. No. 5,788,897, which is a continuation-in-part of Ser. No. 227,785, Aug. 3, 1988, abandoned.

[51] Int. Cl.[6] .......... B29C 47/00

[52] U.S. Cl. .......... 264/210.6; 264/184; 264/205; 428/364

[58] Field of Search .......... 264/211.19, 210.6, 264/210.3, 211.16, 205, 171, 184; 428/364

[56] References Cited

U.S. PATENT DOCUMENTS

| | | | |
|---|---|---|---|
| 4,904,553 | 2/1990 | Nakajima et al. | 429/213 |
| 5,011,643 | 4/1991 | Yang | 264/171 |
| 5,069,820 | 12/1991 | Jen et al. | 252/500 |
| 5,109,070 | 4/1992 | Epstein et al. | 525/189 |
| 5,160,457 | 11/1992 | Elsenbaumer | 252/500 |
| 5,177,187 | 1/1993 | MacDiarmid et al. | 528/422 |
| 5,196,144 | 3/1993 | Smith et al. | 252/500 |

FOREIGN PATENT DOCUMENTS

| | | | |
|---|---|---|---|
| WO 91/05979 | 2/1991 | WIPO | F28F 13/00 |

OTHER PUBLICATIONS

A.G. Green and A.E. Woodhead, Aniline–black and Allied Compounds, Part I, *J. Chem. Soc.*, 97, 2388, 1910.

J. Preston, Polyamides, Aromatic, *Encyclopedia of Polymer Science & Engineering, John Wiley & Sons*, 2nd Ed., vol. 11, 381–409, 1988.

J. Yue et al, Sulfonic Acid Ring–Substituted Polyaniline, A Self–Doped Conducting Polymer, *Mol. Cryst. Liq. Cryst*, 189, 255–261, Oct. 25–27, 1989.

A.F. Diaza and A. Logan, Electroactive Polyaniline Films, *J. Electroanal. Chem*, 111, 111–114, 1980.

Alejandro Andreatta, Alan J. Heeger and Paul Smith, Electrically conductive polyblend fibres of polyaniline and poly–(phenylene terephthalamide), *Polymer Communications*, 31, 275–278, Jul. 1990.

*Primary Examiner*—Merrick Dixon

[57] ABSTRACT

A method to make electrically conductative high strength and high modulus poly(p-phenylene terephthalamide) fibers rendered electrically conductive with sulfonic acid insitu ring-substituted polyaniline.

3 Claims, 1 Drawing Sheet

FIGURE
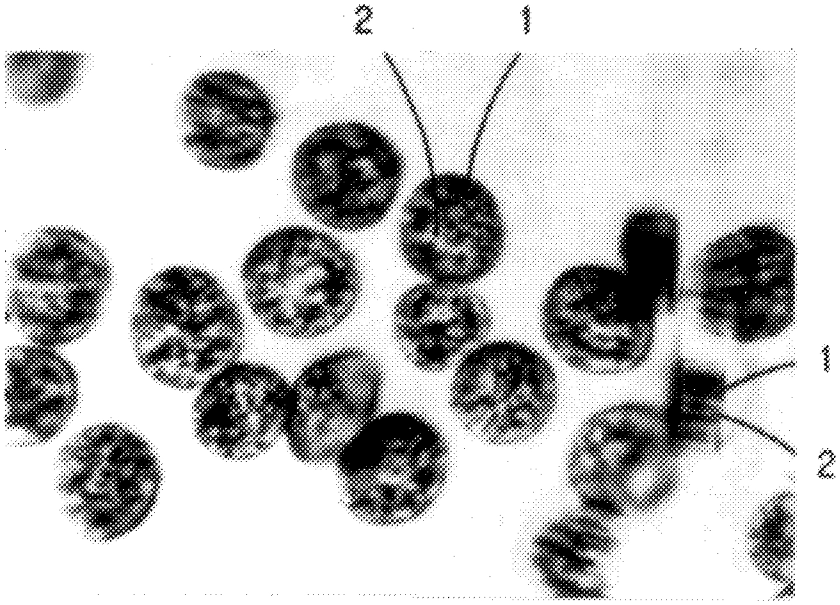

METHOD FOR PREPARING A HIGH STRENGTH, HIGH MODULUS ELECTRICALLY CONDUCTIVE FIBER

RELATED APPLICATIONS

This application is a continuation-in-part of the U.S. application Ser. No. 07/760,180 now U.S. Pat. No. 5,788,897 filed on Sep. 9, 1991 which is in turn a continuation-in-part of the U.S. application Ser. No. 07/227,785, now abandoned filed Aug. 3, 1988.

BACKGROUND OF THE INVENTION

Sulfonic acid ring-substituted polyaniline is a “self-doped” conducting polymer, reported by Yue, Epstein and MacDiarmid in Proc. Symposium on Electroresponsive Molecular and Polymeric Systems, Brookhaven National Laboratory, Oct. 1989, to have a conductivity of ~0.03 S/cm. without external doping. Synthesis of the material is also described in J.A.C.S. 1991, V.113, N.7 pp. 2665–2671 which shows a conductivity of ~0.1 S/cm measured on pressed pellets.

Fibers of a blend of polyaniline and poly(p-phenylene terephthalamide) prepared from homogeneous solutions in 98% by weight sulfuric acid are described in Polymer Commun. 31,275 (1990). The externally doped fibers are said to have improved mechanical properties while retaining the conductivity of pure polyaniline. The concentration of poly(p-phenylene terephthalamide) in the spinning solution employed by the experimenters was below the onset of formation of lyotropic phase, thus, the fibers were spun from isotropic solutions.

MacDiarmid et al., U.S. Pat. No. 5,177,187 taught a process for preparation and spinning of amorphous, 100% by weight polyaniline fibers from solutions of the polymer in concentrated sulfuric acid or N-methyl pyrrolidinone, but the conductivity of the fibers taught by MacDiarmid was achieved by coagulating the fiber in solutions containing hydrochloric acid which served as the external dopant.

Blends of polyaniline and poly(p-phenylene terephthalamide) have been taught by Jen et al. in U.S. Pat. No. 5,069,820 (melt spinning), Smith et al. in U.S. Pat. No. 5,196,144 (solution spinning from 96% sulfuric acid solutions) and Elsenbaumer in U.S. Pat. No. 5,160,457 (spinning from solutions and doping).

The inventors of the present invention wanted a method to prepare high strength, high modulus conductive fibers of consistent and permanent conductivity. In order to achieve such a fiber product they found that only certain sequences of spin dope preparation steps and the use of specific concentrations of sulfuric acid, that is those in excess of 98% by weight, in preparing the spinning solutions resulted in the insitu ring-sulfonation of the polyaniline and the desired mechanical and electrical properties of the fibers.

SUMMARY OF THE INVENTION

The present invention provides a method for preparing a high strength and high modulus electrically conductive fiber consisting essentially of a p-aramid and insitu ring-sulfonated polyaniline from a lyotropic spin solution comprising the steps of:

a. forming a spinning solution of the insitu ring-sulfonated polyaniline and the p-aramid by
   i) dissolving polyaniline polymer in sulfuric acid having a concentration of more than 98% by weight and at a temperature of more than 20° C. followed by adding and dissolving the p-aramid polymer in this solution; or
   ii) dissolving a mixture polyaniline polymer and p-aramid polymer in sulfuric acid having a concentration of more than 98% by weight and at temperatures above 20° C.; or
   iii) dissolving the polyaniline polymer in sulfuric acid having a concentration of more than 98% by weight and at a temperature of more than 20° C. and mixing with this solution a solution of the p-aramid polymer made by dissolving the p-aramid polymer in sulfuric acid having a concentration of more than 98% by weight;

b. extruding the solution through an air gap into a coagulating bath to form the fiber wherein the weight % of ring-sulfonated polyaniline in the fiber is from 3 to 40 on a weight % basis, and the spinning solution contains at least 13 wt. % of total polymer content.

BRIEF DESCRIPTION OF DRAWINGS

The FIGURE is photomicrograph of transverse and longitudinal cross-sections of fibers made according to the present invention at 1200×.

DETAILED DESCRIPTION OF THE INVENTION

The present process provides a spin dope containing insitu ring-sulfonated polyaniline. The term insitu ring-sulfonated means that the polyaniline is sulfonated, but never isolated from the sulfuric acid solution before used to make the spin dope.

The spin dope of the present invention must be prepared by contacting the polyaniline polymer first with sulfuric acid having a concentration of more than 98% by weight and at temperatures in excess of 20° C. This step may be achieved by i) dissolving polyaniline polymer in sulfuric acid having a concentration of more than 98% by weight followed by adding and dissolving the p-aramid polymer in this solution; or ii) dissolving a mixture polyaniline polymer and p-aramid polymer in sulfuric acid having a concentration of more than 98% by weight; or iii) dissolving the polyaniline polymer in sulfuric acid having a concentration of more than 98% by weight and mixing with this solution a solution of the p-aramid polymer made by dissolving the p-aramid polymer in sulfuric acid having a concentration of more than 98% by weight.

It is essential that once the ring-sulfonated polyaniline is formed, it is not isolated from the sulfuric acid solution in which it is formed. The time for sulfonation at the temperatures and acid concentrations of the present invention is the time required for the polyaniline to dissolve in the acid. Under the conditions of the present process, the sulfur content of the resulting ring-sulfonated polyaniline is at least 8% by wt. and is high enough for high conductivity.

The molecular weight of the polyaniline employed in the invention is not critical. Low molecular weights result in lower solution viscosity and easier processing, however, it might be more readily removed from the fiber in processing or use. The p-aramid is used in its high molecular weight form, having an inherent viscosity of at least 5. In order to obtain the desirable high strength, a concentration of the p-aramid is employed that results in a lyotropic spin solution as discussed in U.S. Pat. No. 3,767,756. Spin solutions containing at least 13% by wt. of total polymer content, i.e., sulfonated polyaniline plus the p-aramid, meet this requirement. Otherwise the mechanical properties of the spun fiber will not be acceptable for uses such as incorporation into aramid yarns and fabrics to provide antistatic properties.

The ratio of sulfonated polyaniline to p-aramid in the spin solution and ultimately in the spun fiber has an important influence on fiber properties. As the content of sulfonated polyaniline exceeds 40 wt % of the polymer mixture, the tensile strength of the composite fiber becomes undesirably reduced with no concomitant increase in electrical conductivity. Also in washing some of the insitu ring-sulfonated polyaniline may be extracted.

The ring-sulfonated polyaniline should constitute at least 3 wt % of the spun fiber and preferably 10% by weight to provide electrical conductivity of at least about 0.001 S/cm. The ring-sulfonated polyaniline should constitute from 3 to 40 wt % and preferably from 10 to 30 wt % based on the polymer mixture.

Surprisingly, fibers of the invention composed of this mixture exhibit a level of electrical conductivity far in excess of that of 100% sulfonated polyaniline. It is believed that the spinning process of this invention enhances the conductivity. Also it is surprising that the polyaniline sulfonates at a faster rate than the p-aramid. Thus although the polyaniline is degraded by sulfonation, the p-aramid retains it strength characteristics in the present process.

By "aramid" is meant a polyamide wherein at least 85% of the amide (—CO—NH—) linkages are attached directly to two aromatic rings. Suitable aramid fibers are described in *Man-Made Fibers—Science and Technology,* Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

P-aramids are the primary polymers of this invention for blending with polyaniline and poly(p-phenylene terephthalamide) is the preferred p-aramid. By p-aramid is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 30 mole percent of the p-phenylene diamine or the terephthaloyl chloride, or perhaps slightly higher, provided only that the other diamines and diacid chlorides have no reactive groups which interfere with the polymerization reaction. P-aramid, also, means copolymers resulting from incorporation of other aromatic diamines and other aromatic diacid chlorides such as, for example, 2,6-naphthaloyl chloride or chloro- or dichloroterephthaloyl chloride; provided, only that the other aromatic diamines and aromatic diacid chlorides be present in amounts which permit preparation of anisotropic spin dopes. Preparation of p-aramids and processes for spinning fibers from the p-aramids are described in U.S. Pat Nos. 3,869,429; 4,308,374; 4,698,414; and 5,459,231.

The fibers of the invention have high strength and high modulus with an as-spun tenacity above 10 gpd, a modulus of at least 200 g/d and a reasonable level of conductivity. By "as-spun" is meant that the fibers formed in the spinning step following take-up, have not been subjected to a drawing or heat-treating operation which changes the crystallinity, the molecular orderness or arrangement of the polymer molecules. Washing and drying operations needed to remove solvents or impurities are permitted. The conductivity of the fiber of the invention remains stable under conditions of use and the fiber requires no doping.

As shown in the FIGURE the sulfonated polyaniline is dispersed within the fiber as elongated amorphous structures aligned with the fiber axis. This may explain the high conductivity even at low levels of sulfonated polyaniline in the composite fiber.

The fibers of the present invention are particularly of use to provide antistatic properties to yarns and fabrics made of aramid fibers. Fibers of lower mechanical strength than these of the present invention may lead to poor overall protection when used in uses such as protective apparel for military personnel, oil and chemical workers and workers who must work in high temperature environments or where there is potential for injury from heat or flame.

TEST METHODS

Electrical conductivity

Electrical resistance of fiber at ambient condition is determined by a four probe method for calculation of electrical conductivity. Fiber specimen to be tested is about 1.5 cm long. Room temperature curing silver paste is used for making four electrodes on fiber specimen. The two inner voltage measuring electrodes are about 8 mm apart. Electrical current is applied to the two outer electrodes and the voltage corresponding to the known current is determined with an electrometer. Resistance is calculated based on Ohm's law. Conductivity in S/cm is calculated by normalization based on fiber cross-section and the distance between the voltage electrodes. S corresponds to Siemen.

The conductivity of some fibers having lower conductivity was determined by a two probe method. In this method ten filament yarn cut to about 3.5 cm is glued to two metal posts at both ends with silver paste. The two metal posts as electrode terminals are mounted on a TEFLON block (TEFLON is an E.I DuPont trademark for polytetrafluoroethylene). The fiber distance between the two electrodes is around 2.5 cm to 3.2 cm. Once the silver paste is cured, two alligator probes connected to a Keithley 616 digital electrometer are clipped on the two electrodes for measurement of resistance. The resistance is normalized to conductivity based on sample distance between the two electrodes and total cross-section area of the yarn.

Tensile Test

Tenacity/Elongation/Modulus (T/E/Mi) of single filaments at 1" gauge length are reported in grams per denier for T and Mi and in % for E. The tensile test is determined according to ASTM 2101. Filament denier is determined according to ASTM D1577 using a vibroscope.

Sulfur Element Analysis

Fiber sample is first combusted with oxygen in a flask. The generated $SO_2$ and $SO_3$ gases are absorbed in water. Hydrogen peroxide is added to insure that all sulfur is converted to sulfate. After boiling with platinum black to remove any excess $H_2O_2$, the pH is adjusted. The solution is then added with isopropanol in a 50/50 in ratio to water. The solution is then titrated with a standardized $BaCl_2$ solution for determination of sulfate concentration. The amount of sulfur is determined based on the sulfate concentration.

The following examples are illustrative of the invention and are not intended as limiting.

EXAMPLE 1

This example illustrates air-gap spinning of insitu ring-polyaniline/poly(p-phenylene terephthalamide) solutions of high polymer concentration to form conductive fibers.

Polyaniline was prepared according to the following method. A solution consisting of 134.3 g aniline, 194.4 g 37 wt % HCl solution and 1,350 g deionized water were placed in a two liter jacketed glass reaction vessel under a nitrogen atmosphere. The solution was stirred continuously using a 3 inch diameter twin-blade impeller. A coolant, supplied by a chilling unit, was circulated through the reaction vessel jacket to cool the aniline/HCl solution to −3° C. An oxidant solution consisting of 155 g ammonium persulfate in 270 g water was added to the reaction vessel at a rate of 1.95 ml/min using a syringe pump. Following the addition of the oxidant solution, the reaction mixture was stirred at about −3° C. for 3.5 days. The reactor contents were then filtered and the collected powder was washed by repetitively slurrying in water and filtering, followed by vacuum-drying prior to being neutralized by re-slurrying the powder in 0.15M ammonium hydroxide solution twice for 24 hours each time.

The neutralized polymer was then dried before being washed twice with 1.5 liters of methanol followed by a final wash with acetone. The polymer was dried and stored in a dry box until use. The polymer has an inherent viscosity of 1.29 measured at 30° C. as a 0.5 wt. % solution in $H_2SO_4$ (96.7% conc.) and is not electrically conductive because neutralization with ammonium hydroxide converts the polyaniline from the conductive form (emeraldine salt) to the insulating base form.

A 17 wt % polyaniline/$H_2SO_4$ solution was prepared by adding 10.2 g of the polyaniline (base form) prepared as described above to 49.8 g $H_2SO_4$ (100.15%) which was in a nitrogen-purged glove bag and had been chilled in a pre-dried glass bottle using a dry ice/acetone bath located outside the glove bag. The mixture was stirred vigorously with a spatula while being chilled with the dry ice/acetone bath. The mixture was then transferred to a pre-dried twin cell having a cross-over plate for mixing (see Blades U.S. Pat. No. 3,767,756). The mixture was pushed back and forth through the cross-over plate for 2 hrs at approximately 45° C. to obtain a homogeneous solution of the insitu ring-sulfonated polymer.

The solution in the twin cell was transferred to three pre-dried glass bottles in amounts of 3.32, 7.83,and 9.3 g. The insitu ring-sulfonated polyaniline solutions were mixed with poly(p-phenylene terephthalamide) (PPD-T) and concentrated sulfuric acid (>100%) to prepare 18.6 wt % spin dope solutions having weight ratios of polyaniline:PPD-T of 10:90, 20:80, and 30:70. For example, the 10:90 solution was prepared by mixing 3.32 g of the 17 wt % polyaniline solution with 0.81 g $H_2SO_4$ (100.15 wt %) and 26.19 g of a 19.4 wt % solution of poly(p-phenylene terephthalamide) in $H_2SO_4$ (>100%) at room temperature under nitrogen.

The mixture was then stirred at about 65° C. for 30 min and transferred to a 1 inch diameter twin cell where it was kept at 70° C. for 30 minutes and further mixed at 65° C. for 30 minutes by passing the mixture through a cross-over late between cells to ensure homogeneity. The same procedure was used, adjusting the amounts of poly(p-phenylene terephthalamide) solution and insitu ring-sulfonated polyaniline solution, to prepare spin dopes having insitu ring-sulfonated polyaniline:PPD-T ratios of 20:80 and 30:70.

The spin dopes containing 18.6 wt % polymer were spun through an air gap according to the following procedure. The spin dope solutions prepared above were transferred to one side of the twin cell and a filtration pack consisting of 200 and 325 mesh stainless steel screens and a dynalloy disc was inserted between the twin cell and a single-hole spinneret having a diameter of 3 mil and a length of 9 mil. The spinneret was located 0.25 inch above a one gallon glass container of ice-chilled deionized water. A threadline guide was placed 3 inches below the spinneret in the deionized water. The threadline traveled an additional 8 inches in the water before being wound up on a bobbin which was partially immersed in a deionized water containing tray. The extrusion pressure in pounds per square inch (psi), spinneret temperature (same as spinning cell) and fiber wind-up speeds for the samples spun from the three insitu ring-sulfonated polyaniline/PPD-T solutions are summarized in Table 1. The continuous filament on each bobbin, typically weighing less than 0.3 g, was immersed in 900 ml deionized water for one day immediately after the spinning. The water was changed three times with fresh deionized water during that period. The filament samples were then dried and denier(D)/tenacity(T)/elongation(E)/modulus(M), electrical conductivity and sulfur elemental analysis were measured.

The results in Table 1 show that the fibers are electrically conductive after extensive washing with deionized water. This was unexpected because doped polyaniline typically loses conductivity when contacted with aqueous solutions having a pH greater than about 4.

The fiber samples all contain sulfur which may be attributed to covalently bound sulfonic acid groups in the polyaniline at positions ortho to the imide groups. Due to the processing in concentrated $H_2SO_4$(>100%) at elevated temperatures, sulfonation of the polyaniline occurred in situ. The sulfonic acid groups function as internal dopants to render the polyaniline polymer conductive. This hypothesis is supported by the fact that the sulfur is not readily removed as illustrated in Table 1 for samples 10 and 12. These two samples were immersed in 900 ml 0.1M ammonium hydroxide for 4 hrs. The ammonium hydroxide-treated fibers were then washed extensively with deionized-water. After the neutralization and water washing, the two fiber samples contained 3.24 and 3.21 wt % sulfur. Since the sulfur is not removed by neutralization is evidence that it exists as sulfonated acid groups covalently bound to the polyaniline.

TABLE 1

Data For Insitu Ring-Sulfonated Polyanailine

| Composition** Polyaniline/ PPD-T) | Spinneret Temp (°C.) | Extrusion Pressure (psi) | Wind-Up Speed (ft/min) | D/T/E/M den/gpd/%/gpd | Cond. (S/cm) | Sulfur (wt %)[1] | Sulfur (wt %)[2] |
|---|---|---|---|---|---|---|---|
| 1) 10[9]0 | 70 | 300 | 135 | — | 0.07 | 1.6 | 11.8 |
| 2) 10[9]0 | 70 | 300 | 175 | 1.8/17.6/4.4/402 | — | — | — |
| 3) 10[9]0 | 80 | 300 | 200 | 2.1/15.9/4.7/329 | — | — | — |
| 4) 10[9]0 | 80 | 300 | 200 | — | 0.03 | 1.7 | 12.3 |
| 5) 20[8]0 | 70 | 280 | 200 | — | 1.6 | 2.33 | 9.4 |
| 6) 20[8]0 | 70 | 280 | 200 | 1.5/12.9/3.6/373 | — | — | — |

TABLE 1-continued

Data For Insitu Ring-Sulfonated Polyanailine

| Composition** Polyaniline/ PPD-T) | Spinneret Temp (°C.) | Extrusion Pressure (psi) | Wind-Up Speed (ft/min) | D/T/E/M den/gpd/%/gpd | Cond. (S/cm) | Sulfur (wt %)[1] | Sulfur (wt %)[2] |
|---|---|---|---|---|---|---|---|
| 7) 20[8]0 | 80 | 250 | 200 | — | 0.97 | 2.39 | 9.6 |
| 8) 20[8]0 | 80 | 250 | 200 | 1.8/12.5/4.1/324 | — | — | — |
| 9) 30[7]0 | 70 | 300 | 200 | 1.6/11.6/3.4/387 | — | — | — |
| 10) 30[7]0 | 70 | 300 | 200 | — | 1.7 | — | — |
| 30[7]0 | 70 | 300 | 200 | — | — | 3.24* | 9.1 |
| 11) 30[7]0 | 80 | 250 | 200 | 1.6/13.7/4.0/364 | — | — | — |
| 12) 30[7]0 | 80 | 250 | 200 | — | 1.8 | — | — |
| 30[7]0 | 80 | 250 | 200 | — | — | 3.21* | 9.0 |

*Immersed in 900 ml of 0.1 M ammonium hydroxide solution for 4 hrs followed by extensive deionized-water washing.
**Based on polyaniline and PPD-T content.
[1]Percentage based on total fiber weight (Measured)
[2]Calculated percentage based only on insitu ring-sulfonated polyaniline.

EXAMPLE 2

This example illustrates air-gap spinning of a 15.2 wt % polymer solution in $H_2SO_4$ containing insitu ring-sulfonated polyaniline/PPD-T in a weight ratio of 30/70. A 10 wt % polyaniline/$H_2SO_4$ solution was prepared by mixing 8 g of the polyaniline prepared in Example 1 with 72 g $H_2SO_4$ (100.15%) while cooling with a dry ice/acetone mixture in a dry nitrogen atmosphere. The mixture was then transferred to a twin cell under nitrogen and mixed further at room temperature for two hours to obtain a homogeneous solution. A 15.2 wt % spin dope was prepared by mixing 22.66 g of the 10 wt % insitu ring-sulfonated polyaniline solution with 27.30 g PPD-T/$H_2SO_4$(>100%) at 65° C. in a twin cell under a dry nitrogen atmosphere. The mixture was further mixed at 65° C. for one hour to obtain a homogeneous solution.

The solution was then spun at 80° C., 340 psi extrusion pressure and 195 feet/min wind-up speed using the procedure described in Example 1. After washing with deionized water, as described in Example 1, the filament has D/T/E/M of 2.0/7.9/4.1/265 and electrical conductivity of 0.09 S/cm. Comparing with samples 11 and 12 in Table 1, these results show that the 15.2 wt % insitu ring-sulfonated polyaniline/PPD-T solution yields fiber having longer tensile strength, modulus and electrical conductivity than the 18.6 wt % solution.

EXAMPLE 3

(A Comparative Example)

This example illustrates air-gap spinning of a 13.2 wt % polymer solution in $H_2SO_4$ containing sulfonated polyaniline/PPD-T in a weight ratio of 30/70.

A spin dope was prepared by mixing 5.91 g $H_2SO_4$ (100.15% concentration), 21.91 g PPD-T/$H_2SO_4$ (>100%), and 18.16 g of the 10.0 wt % insitu ring-sulfonated polyaniline/$H_2SO_4$ solution prepared in Example 2 in a twin cell at room temperature for two hours. The twin cell was then heated to 45° C. for additional mixing for one hour to obtain a homogeneous 13.2 wt % insitu ring-sulfonated polyaniline/PPD-T (30/70) solution. The solution was spun into a continuous filament at 70° C., 400 psi extrusion pressure, and 195 feet/min wind-up speed according to the procedure described in Example 1.

After washing with deionized water, as described in Example 1, the filament has D/T/E/M of 3.4/5.5/4.7/206 and electrical conductivity of 0.03 S/cm. Comparing with samples 9 and 10 in Table 1, these results show that the 13.2 wt % insitu ring-sulfonated polyaniline/PPD-T (30/70) solution yields fiber having lower tensile strength, tensile modulus, and electrical conductivity than the 18.6 wt % solution.

EXAMPLE 4

This example illustrates air-gap spinning of insitu ring-sulfonated polyaniline/PPD-T solutions containing 18.6 wt % polymer to form conductive fibers.

Spinning solutions containing 18.6 wt % polymer in concentrated $H_2SO_4$ and having polyaniline/PPD-T ratios of 10/90, 20/80, 30/70 and 40/60 were prepared according to the following procedure. PPD-T (19.4 wt % in $H_2SO_4$), polyaniline polymer (base form) prepared in Example 1, and sulfuric acid (100.15 wt %) were placed in a pre-dried glass bottle in amounts required to form solutions containing 18.6 wt % polymer and the desired insitu ring-sulfonated polyaniline/PPD-T ratio. The bottle was then placed in a nitrogen-purged oven at 70° C. for one hour, after which the mixture was stirred before transferring to a hot (70° C.) twin cell. The twin cell was heated in the nitrogen-purged oven at 70° C. for one hour, after which the mixture was mixed through a cross-over plate for 1.5 hrs to obtain a homogeneous solution.

The insitu ring-sulfonated polyaniline/PPD-T solutions were spun using the procedure described in Example 1. The extrusion pressure, spinneret temperature, and wind-up speed for the individual spinning runs are summarized in Table 2.

Immediately after spinning, the bobbins containing the continuous filaments (approximately 0.3 g fiber each) were immersed in 900 ml deionized water for one day. The water was changed three times with fresh deionized water during that time. D/T/E/M, and electrical conductivity of the water-washed fibers are summarized in Table 2.

Although the fibers were washed extensively with deionized water, they remained electrically conductive. The results in Table 2 also demonstrate that tensile strength and modulus decrease as the insitu ring sulfonated polyaniline/PPD-T ratio increases. The preferred ratio is 30/70 since the fibers have the highest conductivity and yet still have high strength and modulus.

X-ray photographs taken of fibers of each composition show that insitu ring sulfonated polyaniline exists as amorphous polymer whereas PPD-T polymer chains are highly oriented with orientation angles in the range of 13.6 to 14.8. Optical photographs (FIG. 1) of Item 1 of Table 2 show that PPD-T and sulfonated polyaniline are segregated. Insitu ring-sulfonated polyaniline (1) is shown dispersed homogeneously in a matrix of PPD-T (2) in the transverse cross-section and as elongated striations aligned along the fiber axis, in the longitudinal cross-section. This may explain the high conductivity even at the 10/90 ratio.

A section of the fiber of Sample 10 (Example 4) which had been washed extensively with deionized water had a sulfur content of 4.14 wt % and a conductivity of 0.6 S/cm. The remaining section of undried fiber was immersed in 900 ml 0.1M ammonium hydroxide solution for 2 hrs and in another 900 ml fresh 0.1M ammonium hydroxide solution for 6 hrs. The ammonium hydroxide solutions were slightly purple in color following each immersion. The neutralized fiber was then washed in running deionized water for 16 hr, after which it still had a sulfur content of 4.14wt % and a conductivity of 0.3 S/cm.

TABLE 2

Data For Insitu Ring-Sulfonated Polyanailine

| Composition Polyaniline/ PPD-T)[1] | Spinneret Temp (°C.) | Extrusion Pressure (psi) | Wind-Up Speed (ft/min) | D/T/E/M den/gpd/%/gpd | Cond. (S/cm) | Sulfur (wt %)[2] | Sulfur (wt %)[3] |
|---|---|---|---|---|---|---|---|
| 1) 10[9]0 | 80 | 250 | 200 | 2.0/14.2/4.4/353 | — | — | — |
| 2) 10[9]0 | 80 | 250 | 200 | — | 0.03 | — | — |
| 10[9]0 | 80 | 250 | 200 | — | 0.07* | 1.82* | 12.9 |
| 3) 20[8]0 | 75 | 260 | 200 | 1.3/13.8/3.9/418 | — | — | — |
| 4) 20[8]0 | 75 | 260 | 200 | — | 0.8 | — | — |
| 5) 20[8]0 | 80 | 260 | 200 | 1.6/13.6/4.4/346 | — | — | — |
| 6) 20[8]0 | 80 | 260 | 200 | — | 0.4 | — | — |
| 7) 30[7]0 | 75 | 280 | 200 | 1.2/11.4/3.4/372 | — | — | — |
| 8) 30[7]0 | 75 | 280 | 200 | — | 1.5 | — | — |
| 9) 30[7]0 | 80 | 280 | 200 | 0.9/10.6/3.2/380 | — | — | — |
| 10) 30[7]0 | 80 | 280 | 200 | — | 0.6 | 4.14 | 11.1 |
| 30[7]0 | 80 | 280 | 200 | — | 0.3** | 4.14** | 11.1 |
| 11) 40[6]0 | 75 | 350 | 200 | — | 1 | — | — |
| 12) 40[6]0 | 75 | 350 | 200 | 1.9/10.4/3.4/330 | — | — | — |
| 13) 40[6]0 | 80 | 350 | 200 | 2.3/9.7/3.6/293 | — | — | — |
| 14) 40[6]0 | 80 | 350 | 200 | — | 0.4 | 4.41 | 9.5 |
| 40[6]0 | 80 | 350 | 200 | — | 0.04*** | 1.67*** | 3.9 |

*Immersed in 900 ml of 0.1 M ammonium hydroxide solution for 3 hrs and in another fresh 990 ml solution for 4 hrs followed by extensive deionized water washing.
**Same as * except 2 hrs and 6 hrs in the first and second solutions, respectively.
***Same as * except 2 hrs and 4 hrs in the first and second solutions, respectively.
[1]Based on polyaniline and PPD-T content.
[2]Measured percentage based on total fiber weight.
[3]Calculated percentage based only on sulfonated polyaniline.

EXAMPLE 5

This example illustrates the effect of neutralization with ammonium hydroxide on the conductivity of Sample 2 of Example 4(insitu ring-sulfonated polyaniline/PPD-T=10/90).

The conductivity of a section of the fiber of Sample 2 (Example 4) which had been washed extensively with deionized water was measured and found to have a conductivity of 0.03 S/cm.

Another sample of the fiber, without drying, was immersed in 900 ml 0.1M ammonium hydroxide solution for 3 hr and in another fresh 900 ml 0.1M ammonium hydroxide solution for 4 hr. Both ammonium hydroxide solutions were colorless at the end of each immersion. However, the color of the fiber changed from green (conductive form) to blue (insulating form) upon contact with the solution since ammonium hydroxide neutralizes the acid in the fiber. The neutralized fiber was then washed in running deionized water for 6 hr, after which the fiber had reverted back to its original green color. The fiber contained 1.82 wt % sulfur and had a conductivity of 0.07 S/cm.

This result shows that the conductivity is not affected by the neutralization with ammonium hydroxide providing evidence that the sulfur exists as sulfonic acid groups covalently bound to polyaniline.

EXAMPLE 6

This example illustrates the effect of neutralization with ammonium hydroxide on the conductivity of Sample 10 of Example 4 (insitu ring-sulfonated polyaniline/PPD-T=30/70 (wt/wt)).

This example as well as Example 5 illustrate that the polyaniline in the fibers is sulfonated and that the sulfonic acid groups are not readily extracted with basic solutions.

EXAMPLE 7

(A Comparative Example)

A section of the fiber of Sample 14 (Example 4) which had been washed extensively with deionized water had a sulfur content of 4.41 wt % and a conductivity of 0.4 S/cm. The remaining section of undried fiber was immersed in 900 ml 0.1M ammonium hydroxide solution for 2 hrs and in another 900 ml fresh 0.1M ammonium hydroxide solution for 4 hrs. The ammonium hydroxide solutions were dark purple following each immersion. Evidently, some of the polyaniline in the fiber was extracted into the ammonium hydroxide solutions. The neutralized fiber was washed extensively in running deionized water for 13 hrs. The treated fiber had a sulfur content of 1.67 wt %, significantly lower than the sulfur content in the untreated fiber. The conductivity decreased from 0.4 S/cm to 0.04 S/cm. This example suggests that a portion of the sulfonated polyaniline is extractable at insitu ring-sulfonated polyaniline/PPD-T ratios significantly greater than 30/70.

EXAMPLE 8

This example illustrates spinnability of and properties of fibers derived from an insitu ring-sulfonated polyaniline/

PPD-T solution in concentrated sulfuric acid (100.1%) containing 18.6% polymer mixture of insitu ring-sulfonated polyaniline and PPD-T in a weight ratio of 10/90. In this example, the polyaniline was added to concentrated sulfuric acid (100.1%) first prior to the addition of PPD-T.

Into an 150 ml Atlantic mixer, 3.5 g of polyaniline, prepared in accordance with the method described in Example 1, was added with 153.2 g of concentrated sulfuric acid (100.1%). The mixer was stirred for 1 hour at 49° C. to dissolve the polyaniline and let it undergo in-situ sulfonation in concentrated sulfuric acid (100.1%). The solution was then chilled to −50° C. with a dry ice/acetone bath followed by addition of 31.5 g of PPD-T. The mixture was stirred for 1 hour at 70° C. and 1 hour at 80° C. The anisotropic dope was transferred to a spin cell for extrusion into fibers.

The fibers were extruded from a 10-hole spinneret having orifice diameter of 0.076 mm (3 mil), passed through a 0.5 cm air gap and entered an aqueous coagulation bath maintained at 3.1° C.

The cup-shaped quenching bath had a vertical overflowing tube inserted in the middle. The fibers moved downward through the tube following the coagulant, changed direction over a ceramic pin below the tube and wound at 145 meters/min with a spin stretch factor of 7.0. The yarn was thoroughly washed in de-ionized water and dried. The spinnability was excellent and comparable to that generally observed for anisotropic sulfuric acid spin dope containing only PPD-T.

The fiber has a dpf of 2.3 and a combination of tenacity, elongation and initial modulus of 21.6 gpd, 6.0% and 376 gpd, respectively. Sulfur analysis indicated a sulfur content of 12.7% on the basis of insitu ring-sulfonated polyaniline. The fiber conductivity is 0.0065S/cm.

EXAMPLE 9

This example illustrates spinnability of and properties of fibers derived from an insitu ring-sulfonated polyaniline/PPD-T solution in concentrated sulfuric acid (100.1%) containing 18.6% polymer mixture of insitu ring-sulfonated polyaniline and PPD-T in a weight ratio of 10/90. In this example, the polyaniline was added together with PPD-T to concentrated sulfuric acid (100.1%).

Into an 150 ml Atlantic mixer, 153.2 g of concentrated sulfuric acid (100.1%) was added and chilled to −40° C. with a dry ice/acetone bath. 31.5 g of PPD-T and 3.5 g of polyaniline were added into the mixer and stirred for 1 hour at 70° C. and 1 hour at 80° C. The anisotropic dope was transferred to a spin cell for extrusion into fibers.

The fiber was air-gap extruded from a 10-hole spinneret having orifice diameter of 0.076 mm (3 mil) and wound at 145 meter/min following the fiber spinning procedure described in Example 8. The yarn was thoroughly washed with de-ionized water and dried. The spinnability was excellent and comparable to that generally observed for anisotropic sulfuric acid spin dope containing only PPD-T. The fiber has a dpf of 2.3 and a combination of tenacity, elongation and initial modulus of 21.6 gpd, 6.2% and 338 gpd, respectively. Sulfur analysis indicated a sulfur content of 12.4% % on the basis of insitu ring-sulfonated polyaniline. The fiber conductivity is 0.0038 S/cm.

Comparative Example C1 for Examples 8 & 9

This comparative example shows the disadvantage of a dope preparation procedure not following the teaching of the present invention as exemplified in Examples 8 and 9. In Comparative Example C1, the ring-sulfonated polyaniline was prepared in separate step and later added to PPD-T and concentrated sulfuric acid (100.1%) to form spin dope. The spin dope composition is identical to Examples 8 and 9, i.e., a ring- sulfonated polyaniline/PPD-T solution in concentrated sulfuric acid (100.1%) containing 18.6% polymer mixture of polyaniline and PPD-T in a weight ratio of 10/90.

The spin dope preparation for this example consists of two steps: preparation and isolation of ring-sulfonated polyaniline and dope preparation. The preparation of sulfonated polyaniline is as follows. Into a 150 ml Atlantic mixer, 10.5 g of polyaniline, prepared in accordance with the method described in Example 1, was added with 153.2 g of concentrated sulfuric acid (100.1%). The mixer was stirred for 1 hour at 49° C. to dissolve polyaniline and let it undergo sulfonation in concentrated sulfuric acid (100.1%). The sulfonated polyaniline was recovered (isolated) by pouring the content of the mixer into 2000 ml of ice water and stirred for 30 minutes.

After filtering away the excess water, the ring-sulfonated polyaniline was transferred into a Waring blender and rigorously stirred in 300 ml of de-ionized water for 3 minutes, filtered, and stirred at slow speed in a second portion of 300 ml de-ionized water for 1 hour. This 2-step washing procedure in the Waring blender was repeated 4 more times until the sulfonated polyaniline appeared to be neutral in acidity. The ring-sulfonated polyaniline was then rinsed in acetone, filtered, and dried overnight at 65° C. in a vacuum oven. The ring-sulfonated polyaniline weighed 11.5 g with a sulfur content of 5.81%. For comparison, the sulfur content of the starting polyaniline material is 0.31%.

The dope preparation procedure for this comparative example is as follows. Into an 150 ml Atlantic mixer, 153.2 g of concentrated sulfuric acid (100.1%) was added and chilled to −43° C. with a dry ice/acetone bath. 31.5 g of PPD-T and 3.5 g of the sulfonated polyaniline prepared in accordance with the method described above were added into the mixer. The mixtures were stirred for 1 hour at 70° C. and 1 hour at 80° C. The resulting dope was transferred to a spin cell for extrusion into fibers.

The fiber was air-gap extruded from a 10-hole spinneret having orifice diameter of 0.076 mm (3 mil) and wound at 145 meter/min following the fiber spinning procedure described in Example 8. The spinnability was extremely poor due to poor dope quality resulting in fast increasing pack pressure observed during spinning. The yarn was thoroughly washed in de-ionized water to remove all acid and dried. The fiber has a dpf of 2.3 and a tenacity, elongation and initial modulus of 14.4 gpd, 5.5% and 256 gpd, respectively. Sulfur analysis showed a sulfur content of 13.0% on the basis of insitu ring-sulfonated poylaniline. The fiber conductivity is $4.9\times10^{-9}$ S/cm.

EXAMPLE 10

This example illustrates spinnability of and properties of fibers derived from insitu ring-sulfonated polyaniline/PPD-T solution in concentrated sulfuric acid (99.8%) containing 18.6% polymer mixture of polyaniline and PPD-T in a weight ratio of 10/90. In this example, the polyaniline was added first to concentrated sulfuric acid (99.8%) prior to the addition of PPD-T.

Into an 150 ml Atlantic mixer, 3.5 g of polyaniline, prepared in accordance with the method described in Example 1, was added with 153.2 g of concentrated sulfuric acid (99.8%). The mixer was stirred for 1 hour at 52° C. to dissolve polyaniline and let it undergo insitu ring-sulfonation in concentrated sulfuric acid (99.8%). The solution was then chilled to −44° C. with a dry ice/acetone bath followed by addition of 31.5 g of PPD-T. The mixture was stirred for 1 hour at 70° C. and 1 hour at 80° C. The anisotropic dope was transferred to a spin cell ready for extrusion into fibers.

The fibers were extruded from a 10-hole spinneret having orifice diameter of 0.076 mm (3 mil) and wound at 195 meter/min following the procedure described in Example 8. The spin stretch factor for this example was 9.4. The yarn was thoroughly washed in de-ionized water to remove all acid and dried. The spinnability was excellent and comparable to that generally observed for anisotropic sulfuric acid spin dope containing only PPD-T. The fiber has a dpf of 1.7 and a combination of tenacity, elongation and initial modulus of 18.9 gpd, 5.3% and 319 gpd, respectively. Sulfur analysis indicated a sulfur content of 11.3% % on the basis of insitu ring-sulfonated polyaniline. The fiber conductivity is 0.0043 S/cm.

The fiber was treated in the following manner to demonstrate that the measured fiber conductivity was intrinsic resulting from the sulfonic acid groups permanently attached to the aniline rings of polyaniline molecules as reflected in the sulfur content analysis. A small portion of the fibers was immersed in 0.1M aqueous solution of sodium hydroxide for 2.5 hours. The treated fibers were then immersed in de-ionized water for 14 hours. During this time, water was changed at least seven times. After dried, the fiber exhibited a conductivity of 0.003 S/cm, which is about the same as the fiber conductivity before washing. If the acid groups were not permanently attached to the aniline rings of the polyaniline molecules, the fiber would exhibit temporary conductivity, and lose the conductivity completely upon exposure to alkali washing.

EXAMPLE 11

Example 11 describes a dope preparation procedure in that the polyaniline was added with the PPD-T into concentrated sulfuric acid (99.8%).

Into an 150 ml Atlantic mixer, 153.2 g of sulfuric acid (99.8%) was added and chilled to −44° C. with a dry ice/acetone bath. 31.5 g of PPD-T and 3.5 g of polyaniline were added into the mixer and stirred for 1 hour each at 70° C. and 80° C., respectively. The anisotropic dope was transferred to a spin cell for extrusion into fibers.

The fibers were extruded from a 10-hole spinneret having orifice diameter of 0.076 mm (3 mil) and wound at 145 meters/min following the fiber spinning procedure described in Example 8.

The yarn was thoroughly washed with de-ionized water to remove all acid and dried. The spinnability was excellent and comparable to that generally observed for anisotropic sulfuric acid spin dope containing only PPD-T. The fiber has a dpf of 2.3 and a combination of tenacity, elongation and initial modulus of 18.3 gpd, 5.9% and 292 gpd, respectively. Sulfur analysis indicated a sulfur content of 10.0% % on the basis of insitu ring-sulfonated polyaniline. The fiber conductivity is 0.0182 S/cm.

Comparative Example C2

This example illustrates the effect of using regular concentrated sulfuric acid (95–98%) in dope preparation on fiber spinnability and properties. The example consists of air-gap spinning of a polyaniline/PPD-T solution in regular concentrated sulfuric acid (95–98%) containing 18.6% polymer mixture of polyaniline and PPD-T in a weight ratio of 10/90. In this example, the polyaniline was added first to regular concentrated sulfuric acid (95–98%) prior to the addition of PPD-T.

Into an 150 ml Atlantic mixer, 3.5 g of polyaniline, prepared in accordance with the method described in Example 1, was added with 153.2 g of concentrated sulfuric acid (95–98%). The mixer was stirred for 1 hour at 50° C. to dissolve polyaniline and let it undergo sulfonation in sulfuric acid. The solution was then chilled to −46° C. with a dry ice/acetone bath followed by addition of 31.5 g of PPD-T. The mixture was stirred for 1 hour at 70° C. and later 1 hour at 80° C. The dope mixture exhibited a dry appearance and additional concentrated sulfuric acid (95–98%) was added in steps resulting in a final solids level of 12%. The spin dope, which was anisotropic, was transferred to a spin cell ready for extrusion into fibers.

The fibers were extruded from a 10-hole spinneret having orifice diameter of 0.076 mm (3 mil), passes through a 0.5 cm air gap and entered an aqueous coagulation bath (at 4.8° C.). The fibers were weak and became discontinuous while passing through the quenching bath and the overflowing tube. The short fibers were collected, washed thoroughly with de-ionized water and dried. The short fiber has a dpf of 7.2 and a combination of tenacity, elongation and initial modulus of 3.6 gpd, 11.2% and 55 gpd, respectively. Sulfur analysis indicated a sulfur content of 6.0% % on the basis of insitu ring-sulfonated polyaniline. The fiber conductivity is less than $2.4\times10^{-9}$, which is about six orders of magnitude lower than for fibers prepared similarly with 100.1% (Example 8) and 99.8% (Example 10) concentrated sulfuric acids.

This example illustrates that the lower limit for sulfuric acid concentration is 98%. Only sulfuric acids with concentrations higher than 98% would produce fibers having strong tensile properties and high conductivity without the needs of external acid doping.

We claim:

1. A method for preparing a high strength and high modulus electrically conductive fiber consisting essentially of a p-aramid and insitu ring-sulfonated polyaniline from a lyotropic spin solution comprising the steps of:

a. forming a spinning solution of the insitu ring-sulfonated polyaniline and the p-aramid by
   i) first dissolving polyaniline polymer in sulfuric acid the acid having a concentration of more than 98% by weight and being at a temperature of more than 20° C. followed by adding and dissolving the p-aramid polymer in this solution; or
   ii) dissolving a mixture polyaniline polymer and p-aramid polymer in sulfuric acid the acid having a concentration of more than 98% by weight and being at temperatures above 20° C.; or
   iii) dissolving the polyaniline polymer in sulfuric acid the acid having a concentration of more than 98% by weight and being at a temperature of more than 20° C. and mixing with this solution a second solution of the p-aramid polymer made by dissolving the p-aramid polymer in sulfuric acid the acid having a concentration of more than 98% by weight.

b. extruding the solution through an air gap into a coagulating bath to form the fiber wherein the weight % of ring-sulfonated polyaniline in the fiber is from 3 to 40 on a weight % basis, and the spinning solution contains at least 13 wt. % of total polymer content.

2. The method of claim 1 wherein the p-aramid is poly (p-phenylene terephthalamide).

3. A fiber made according to the method of claim 1.

* * * * *